United States Patent
Fiammengo

(10) Patent No.: US 8,052,909 B2
(45) Date of Patent: Nov. 8, 2011

(54) INJECTION MOULDING PROCESS

(75) Inventor: Fabio Fiammengo, Mogliano Veneto (IT)

(73) Assignee: Uniteam Italia SRL, Quarto d'Altino (IT)

( * ) Notice: Subject to any disclaimer, the term of this patent is extended or adjusted under 35 U.S.C. 154(b) by 0 days.

(21) Appl. No.: 12/701,882

(22) Filed: Feb. 8, 2010

(65) Prior Publication Data
US 2010/0187722 A1   Jul. 29, 2010

Related U.S. Application Data

(63) Continuation of application No. PCT/IT2007/000581, filed on Aug. 9, 2007.

(51) Int. Cl.
*B29C 45/16* (2006.01)
(52) U.S. Cl. ........ 264/255; 264/266; 425/112; 425/130; 425/588
(58) Field of Classification Search .................. 264/255, 264/266; 425/588, 130, 112
See application file for complete search history.

(56) References Cited

U.S. PATENT DOCUMENTS

| | | | |
|---|---|---|---|
| 4,385,025 | A | 5/1983 | Salerno et al. |
| 6,123,889 | A | 9/2000 | Katagiri et al. |
| 2003/0178744 | A1 | 9/2003 | Schneider |
| 2007/0057401 | A1 | 3/2007 | Dooley et al. |

FOREIGN PATENT DOCUMENTS

| | | |
|---|---|---|
| JP | 60-247520 | 12/1985 |
| JP | 10-315241 | 12/1998 |
| JP | 2003-154544 | 5/2003 |
| WO | 89/04751 | 6/1989 |

OTHER PUBLICATIONS

International Search Report and Written Opinion of the International Searching Authority dated May 28, 2008, from the corresponding International Application.

*Primary Examiner* — Jill Heitbrink
(74) *Attorney, Agent, or Firm* — Katten Muchin Rosenman LLP

(57) ABSTRACT

Method for molding a multi-component manufactured product through injection of plastic materials in a mold comprising on the inside one or more movable parts, characterized in that the movable parts are moved into a first configuration in which at least two distinct mold cavities are made in the mold, plastic material is injected into each of the two distinct mold cavities to form two components of the manufactured product, the movable parts are moved into a second configuration, in which they make at least a third cavity in the mold the walls of which at least partially consist of the two components already injected, plastic material is injected into the third mold cavity to form a third component of the manufactured product that is thus welded to the first two.

15 Claims, 4 Drawing Sheets

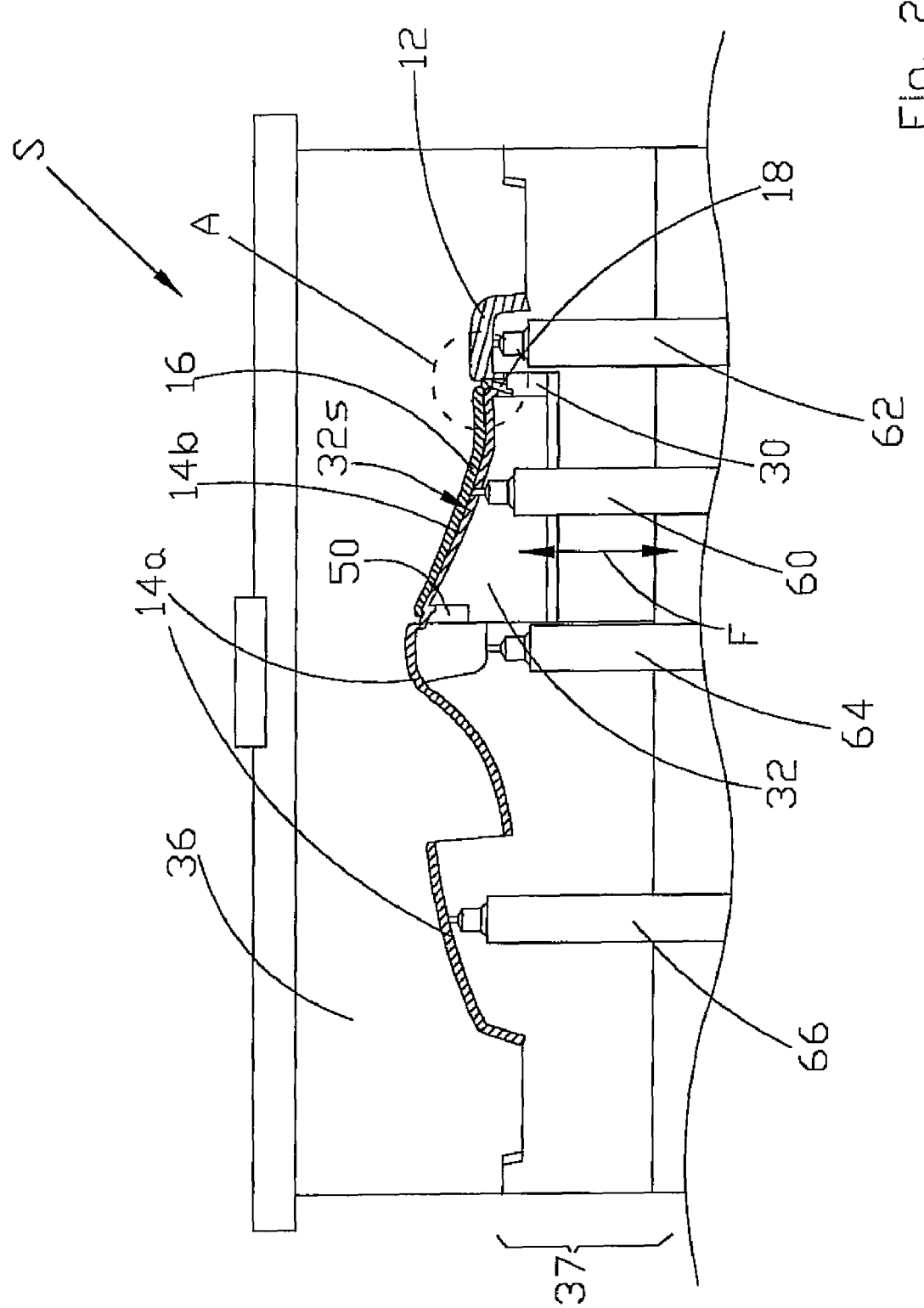

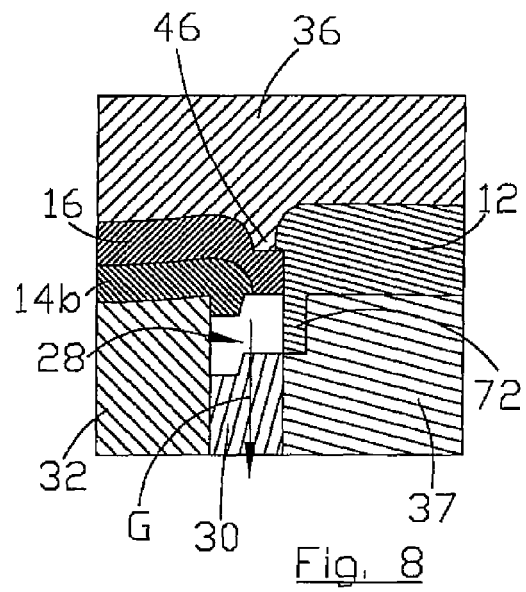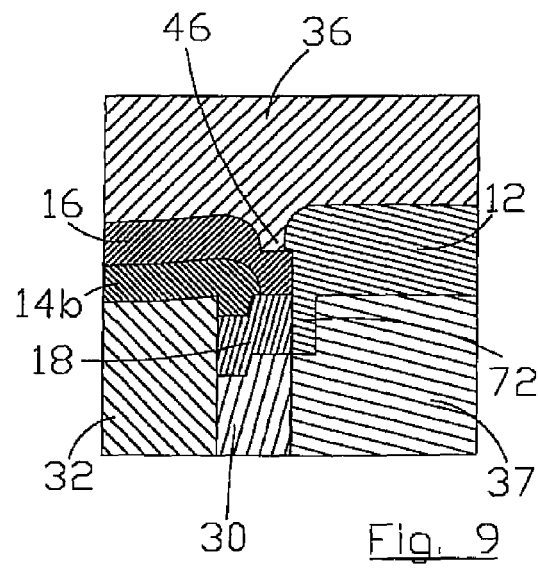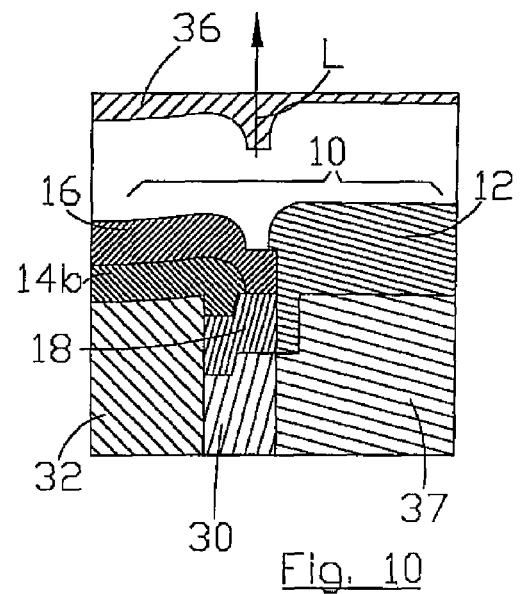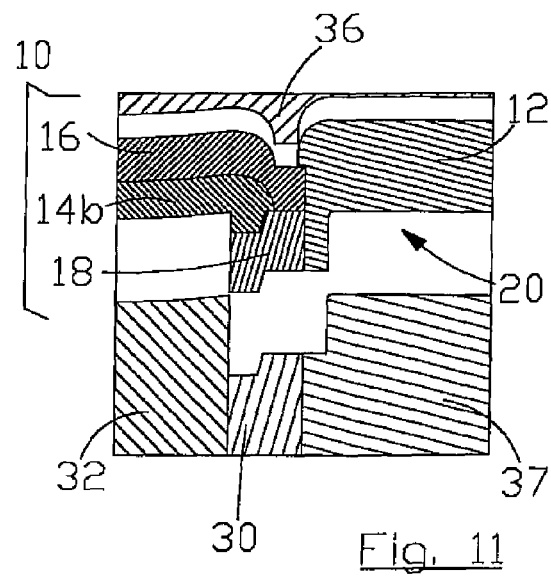

INJECTION MOULDING PROCESS

The present invention concerns an injection moulding process of an element formed from many components, particularly the interior of door of cars.

Elements like the interior of door of cars are formed from many components, made in separate moulding processes, and then assembled through welding or assembly. These operations require a mould for each component and many assembly stations, with consequent disadvantages in terms of production times and costs.

In order to reduce at least the production costs, elements formed from three or more components of different colours or thermoplastic materials are made through blade moulding or rotational or translational sandwich moulding operations.

In the case of translation moulding, after the injection of a first and a second material in a single mould in two successive steps, the piece thus formed is taken from the mould by a robot that inserts it into the cavity of a second mould. The problems of a process of this type consist of the long time taken (for the robot to pick it up) and the difficulty in making the coupling with the second mould (e.g. due to shrinkage of the material that is difficult to calculate).

In the case of rotation sandwich moulding, the piece made in the first mould stays joined to a punch that, by rotating, takes the piece in a second matrix, with consequent saving of time. The coupling with the second matrix is still difficult to carry out due to shrinkage of the piece after the first injection.

In moulding with a mould using blades only a single punch and a single matrix are needed. For the formation of the single components internal movements of the blades are used that, in moving, leave the spaces necessary to form the mould cavities. However, the blades overheat in contact with the molten material and expand, and the creation of accidental interstices, clogging or jamming have always blocked significant developments for this technology.

For example, US patent application US-A-20030178744 describes an injection moulding process of a capsule comprising a base and a cap joined together so that they can move, each made from a different material. In order to be able to make a capsule from two different materials in a single process, inside the mould there is a mobile blade that defines two chambers. The process foresees that after the injection of a first material into a chamber, the mobile blade frees the passage for the injection of the second material. In this way, the hinging point between cap and base corresponds to the joining point of the two different materials. The patent also generically refers to more than two injected materials, still with the characteristic of obtaining two materials hinged together. It does not refer to pieces made up of many parts arranged on many layers.

The main object of the invention is to obtain a manufactured product, for example an interior of a car's door, consisting of three or more components of different material and/or colour welded together, in a single moulding process (be it using blades or of the rotation sandwich type or translation type), so as to reduce the costs and the production time of the manufactured product (linked to the need to have many moulds and therefore a larger workforce).

Another object is to obtain a piece or manufactured product in any case consisting of thermoplastic materials that are compatible with each other and therefore entirely recyclable.

This and other objects are accomplished by a mould that can be used to mould a multi-component manufactured product through injection of plastic materials and comprising on the inside one or more mobile parts, characterised in that the mobile parts are movable into a first configuration, in which at least two distinct mould cavities are made in the mould, and into a second configuration, where, once it has been achieved, they make at least a third cavity in the mould communicating with the other cavities, all or at least two, successive corresponding components of the manufactured product being able to be made by injection in each of said cavities.

According to a preferred embodiment the mould comprises as movable part a sliding block having a surface that constitutes a wall of one of said at least two distinct cavities and suitable for moving perpendicularly to said surface between at least two operative positions. This solution has the great advantage that the third cavity is obtained after the injection into the first two and does not have to be provided, with high production costs for the mould.

Advantageously, the sliding block can be made to comprise a hot chamber in which to house an injector the nozzle of which opens onto said surface (enormous simplification of the internal structure of the mould).

Advantageously, the sliding block can carry at least one blade suitable for separating at least two mould cavities. The blade can thus move with the block, simplifying the internal mechanisms of the mould.

In order to obtain complex manufactured products it is advantageous for the two blades to be mounted at two ends of the sliding block, whereas there is an excellent degree of freedom in moulding, which allows complex manufactured products to be made, if a movable blade is mounted on the sliding block so that it can move there relative to it along the same direction of movement and it can move between at least two operative positions. The combination of at least two positions for the sliding block and at least two positions for the carried blade generates at least four configurations of the inner parts of the mould, with wide-ranging possibilities of designing variants for the finished manufactured product.

Overall, the sliding block can be mounted in a first mould portion (e.g. a mould punch) opposite a second mould portion (e.g. a mould matrix) separable from the first, so that the union of the two portions creates the at least two distinct mould cavities. The movement of the block with a component on top thereof will leave space for the third cavity, which does not have to be physically made in the mould, with an enormous saving in cost and complexity of the mould.

The second mould portion can comprise a ribbing, projecting inside a mould cavity, arranged opposite a blade mounted on the movable block, so that the blade can abut against it constituting the separating wall of two adjacent mould cavities. This solution makes it easier to construct the movable block and improves the seal of the blades.

The invention also concerns a method for moulding a multi-component manufactured product through injection of plastic materials in a mould comprising on the inside one or more movable parts, characterised in that the movable parts are moved into a first configuration in which they make at least two distinct mould cavities in the mould, plastic material is injected into each of the two distinct mould cavities to form two components of the manufactured product, the movable parts are moved into a second configuration, in which they make at least a third cavity in the mould the walls of which at least partially consist of the two components already injected, plastic material is injected into the third mould cavity to form a third component of the manufactured product that is thus welded to the first two.

An improvement of the method of the invention is obtained with the further steps of moving the movable parts into a third configuration, in which at least a fourth cavity is formed in the mould the walls of which at least partially consist of the three components already injected, making a fourth element of the manufactured product by injection in the fourth cavity, which adheres to the components already injected and, after cooling, it is welded thereto.

The fourth element reinforces the welding regions of the other three and/or can constitute a further aesthetic enhancer.

In the method it is preferable, because it is advantageous, to use the same movable part both to make the at least two distinct mould cavities in the mould and to form the fourth cavity, preferably in the form of a sliding blade. This greatly reduces the complexity of the mould.

In the method it is preferable, because it is advantageous, to use a block, able to slide inside the mould, to constitute a wall of one of said at least two distinct mould cavities, and to move the block to take a piece injected on it away from the opposite wall of the cavity, the space thus freed constituting said at least third cavity. The need to make the third cavity in the mould is thus avoided.

In the method it is also preferable to mount said same movable part on the sliding block so that it can translate in the same direction of movement as the block. This option provides multiple degrees of freedom in designing the mould steps.

In general, as steps of the method it is also possible to consider adopting and/or providing the constructive characteristics of the mould described above.

With the invention it is possible to use a moulding process either using blades or of the rotation sandwich type or of the translation sandwich type, given that the technical teaching is applicable to all of these types of mould. For example, the mobile block adapts very well to use in all types of mould.

Preferably, moulding with blades requiring a single mould is used, with a reduction of the production costs. It is also not necessary to move the semi-worked product between successive workstations, with a saving of time, and the adhesion between components is improved because they weld without cooling down.

The aspects and advantages of the present invention shall become clearer from the following description given purely as an example, with reference to the attached drawings, in which:

FIG. 2 is a side section view of the mould used to make the interior-door of FIG. 1;

FIGS. 4 to 11 illustrate steps of a method according to the invention.

Figure 1:
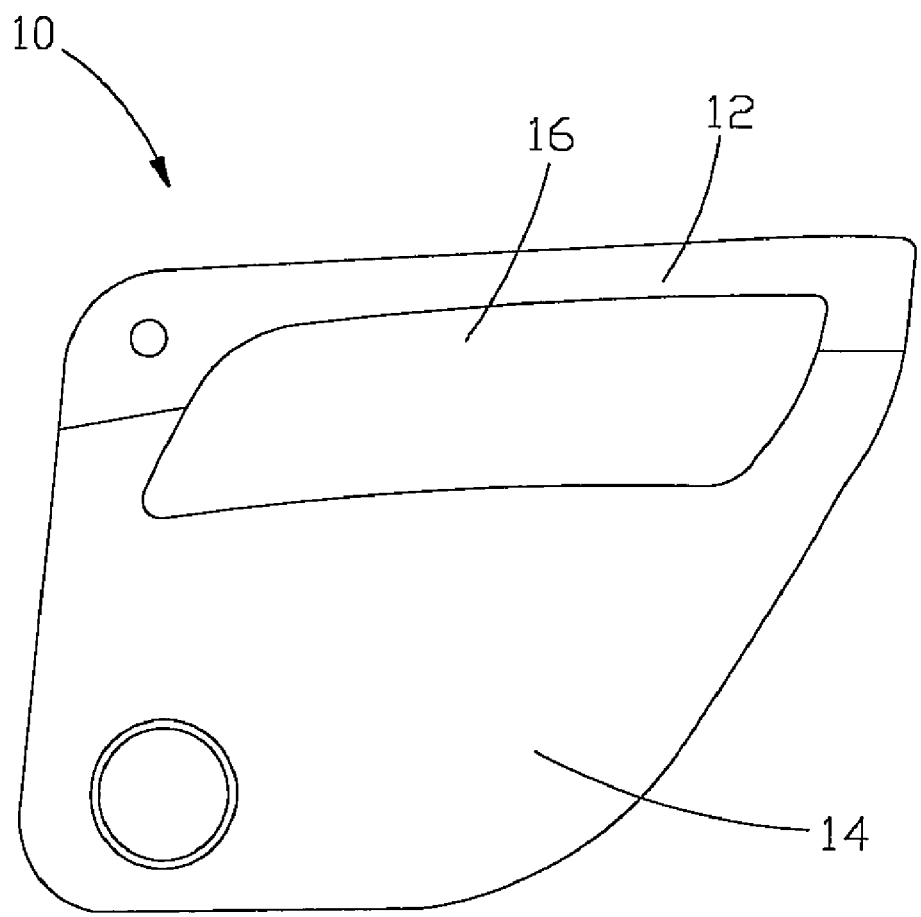
FIG. 1 is a side view of an interior of door for a car made with a method according to the invention.

With reference to FIG. 1, reference numeral 10 indicates the inner covering made from plastic material of a door for automobiles that comprises three components 12, 14, 16 joined together.

As can be seen in FIG. 2, the component 14 in one of its parts 14*b* acts as a base for the surface component 16 that is in turn brought up to the component 12. A second part 14*a* of the component 14, on the other hand, has nothing on top of it.

Figure 3:
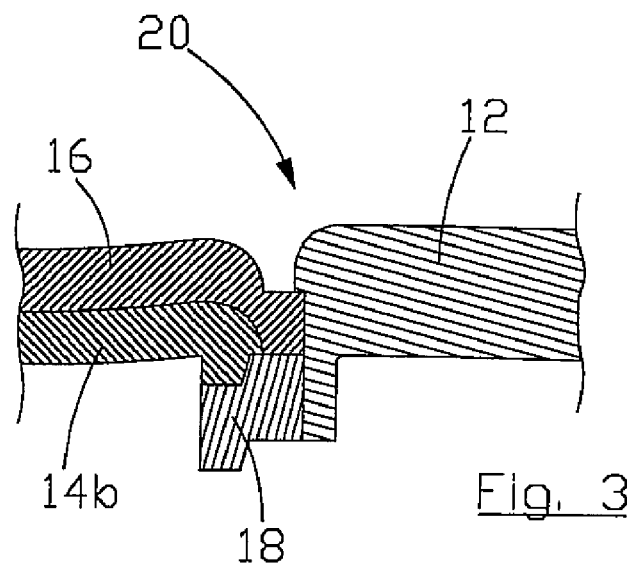
FIG. 3 is the enlarged view of a detail indicated in the dashed circle A of FIG. 2.

There is also a connection and joining element 18 that joins the ends of the components 12, 16 (see FIG. 3), and another connection element (not shown) that joins the ends of the parts 14*a*, 14*b*.

In order to make the covering 10, a mould S is used (FIG. 2) comprising a punch 36 able to be coupled with a matrix 37, where there are half-cavities divided by movable blades. Inside the matrix 37 there is a truck or movable block 32 arranged to slide linearly in the matrix 37 (see double arrow F in FIG. 2), moving away from or towards the punch 36. The block 32 faces towards the punch 36 with one of its surfaces 32*s*.

As shall be explained better, the block 32 in moving creates the space for the injection of the component 16.

The movable block 32 is equipped with a movable blade 30, arranged between a side thereof and a wall of the matrix 37, and with another blade 50 that is used to join the components 14*a*, 14*b* in the left part (in FIG. 2) of the covering 10. The blades 30, 50 are mounted so that they can slide on the block 32, in such a way that they can move along its directrix F and if necessary go into abutment on the punch 36.

For the injection of the various components there are some known hot chambers 60, 62, 64, 66 in the mould S, in which known injectors are inserted from the outside.

Figure 4:
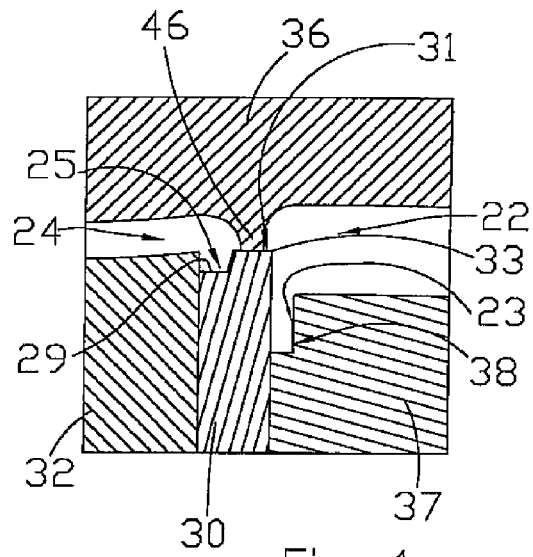
Figure 5:
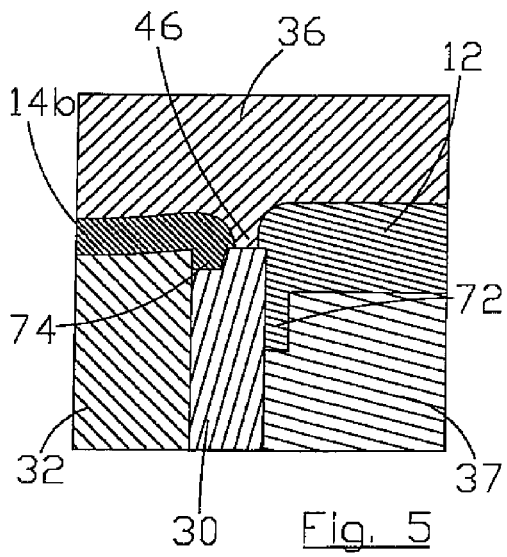
Figure 6:
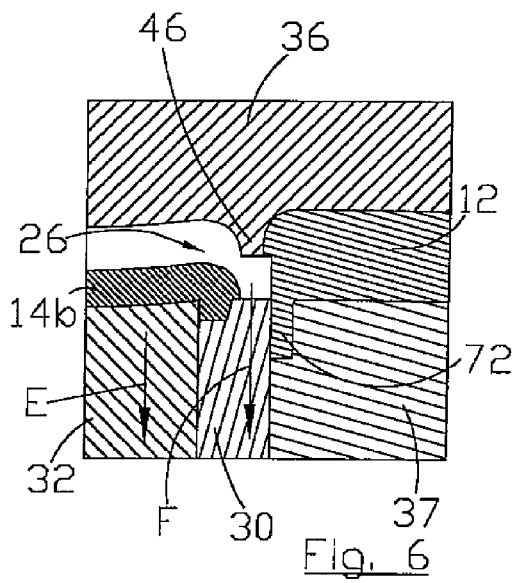

The blade 30 (see FIG. 4 and thereafter) on the end facing towards the punch 36 forms a step, so that there is an edge in relief 33 that is thinner than the width of the blade 30. The flat surface 31 of the relief 33 can abut on an opposite projecting ribbing 46 of the punch 36. At the base of the relief 33, still on the end of the blade 30, a surface 29 is defined, which stands back with respect to the surface 31.

When the blade 30 is pushed towards the ribbing 46 an inner cavity of the mould S is able to be divided into two insulated chambers, which are located at the sides of the blade 30. Such chambers are indicated as a first chamber 22 and a second chamber 24.

The block 32 (on the left in FIGS. 4-11) in the vicinity of the ribbing 46 has a substantially right-angled corner next to which the surface 29 is arranged. The projection of the ribbing 46 and the misalignment between the surfaces 29, 31 is such that, with the blade 30 abutting on the ribbing 46, a recess 25 is defined in the second chamber 24 at the step on the blade 30. The base of the recess is represented by the surface 29.

On the side corresponding to the relief 31 the matrix 37 has a step 31 that creates a recess 23 (indicated in FIG. 4) in the first chamber 22 defined by the side wall of the blade 30 and by the walls of the step 31.

The blade 50 has a similar construction to the blade 30, as the mould parts adjacent to it are substantially analogous to those described for the blade 30. Therefore, we shall describe in detail what happens around the blade 30, with obvious extension for the effects of the blade 50.

The process for making the covering 10 is therefore the following.

Initially (see FIG. 5), after having closed the mould S to match up the half-cavities of the punch 36 and the matrix 37, the block 32 is moved into a position of maximum approach to the punch 36 and the blades 30, 50 are moved to take them into abutment on the punch 36. This leads to the formation of the two chambers 24 and 22 (the block 32 does not touch the punch 36, and therefore its surface 32*s* forms a wall of the cavity 24).

An injection into the first chamber 22 of a material that makes the component 12 is carried out. Thanks to the shape of the chamber 22, the component 12 will have a projecting edge 72 formed in the recess 23.

Preferably, at the same time, a second material is injected into the second chamber 24 to form the part 14*b* of the component 14, which will also have a projecting edge 74 formed from filling the recess 25.

Preferably, at the same time, the same material for forming the part 14a of the component 14 is injected. It should be noted that the blade 50 in this step divides the parts 14a, 14b.

In a subsequent step the block 32 and the blades 30, 50 are integrally and simultaneously moved away (see arrows E and F in FIG. 6) from the punch 36. The component 14b, which remains attached to the surface 32s, also translates remaining joined to the block 32 and to the blade 30. Without the blade 50, the withdrawal of the block 32 would have broken the component 14b because it is attached to the immobile portion 14a.

Between the punch 36 and the translated component 14b a third cavity 26 (FIG. 6) is thus formed that communicates with at least portions of the components 12, 14b already injected. The lowering of the blade 30, indeed, uncovers a side portion of the edge 72, the uncovered surface of which will be used as gripping surface for a new component.

Then plastic material (for example TPE or TPU) is injected into the cavity 26 to form the component 16. In this step a soft component or else a rigid material of a different colour can be injected. The injection can take place using the hot chamber 60. Indeed, the corresponding nozzle is not necessarily covered by the component 14b: it is sufficient to foresee that a through-hole is there right in front of the nozzle, e.g. making a projecting tooth in the punch 36 right opposite that occupies a volume corresponding to the hole. When the block 32 has been moved, this tooth moves away, leaving the space empty. The arrangement on the block 32 of the chamber 60, whose relative injector introduces molten material through the component 14b, makes it possible to avoid having moulding cavities in view, since the injection of the component 16 takes place from the side not in view when the covering 10 is mounted on the door of the automobile.

Figure 7:
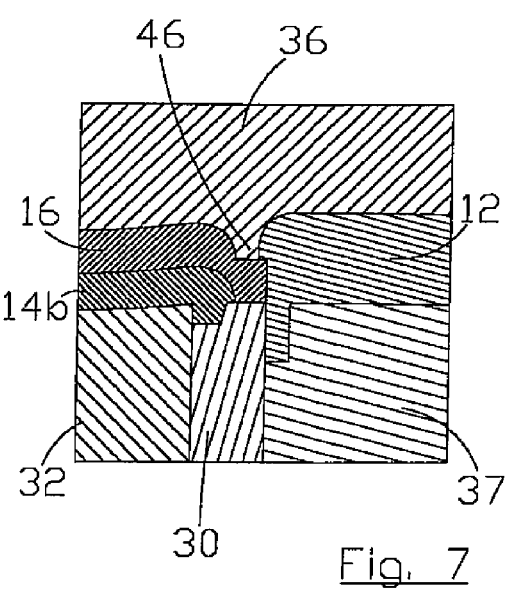

It should be noted that the component 16 solidifies in the cavity 26 in contact with the uncovered surface of the component 12, and fixes there (FIG. 7). The adhesion between the different materials must be of the chemical-physical type otherwise if two materials are not compatible they detach (in which case some mechanical fasteners or else glues or welding would be needed).

This is important because the piece has aesthetic value and therefore defects cannot be permitted.

A material is also injected at the blade 50, which will form an element for joining and welding the parts 14a, 14b.

Thereafter, the blade 30 is moved away from the punch 36 (arrow G in FIG. 8) but keeping the block 32 and the matrix 36 fixed. A new cavity 28 communicating with the ends of the components 12, 14b, 16 is thus created. Indeed, the blade 30 uncovers the end portion of the edge 72 and the overlapping end parts of the components 14b, 16, the surface of which shall be used as gripping surface.

Plastic material is then injected into the cavity 28 thus forming the component 18 (FIG. 9) that is in contact with and joins all of the components 12, 14b, 16. It should be noted that the component 18 is fixed to the component 12 along the edge 72.

Preferably, to accelerate the moulding steps, the material that is used as welding element between the parts 14a and 14b and the parts 12, 14b and 16 is the same and the two welding elements are injected at the same time.

Finally, the punch 36 is moved away (arrow L in FIG. 10) from the block 32 and from the matrix 37, uncovering the product 10 made.

The product 10 is finally taken out from the mould S (FIG. 10).

It should be noted that the product 10 thus made is formed from components not only next to one another, but also on top of one another. In this way the interior door can comprise one type of material on one side and a different material on the opposite side.

The invention clearly is open to variants. The shape of the blade 30 and 50 has a step because the contact surface between the component 14b and the component 18 is thus increased, thus increasing the adhesion. The same goes for the parts 14a, 14b with regard to the blade 50. The blades could in any case also be straight, or shaped differently to obtain particular contact surfaces or cavity walls.

Even if the described shaping of the joining interface of the components 12, 14b, 16 allows them to be connected together and with the fourth component 18, it should be understood that other selections are possible, e.g. inverting the position of the step 31, making it on the block 32, and/or selecting a blade 30 having a shape mirroring the one shown.

According to variants of the invention the process can foresee further displacements of movements inside the matrix, configuring further cavities for the injection of further layers of material. Moreover, the mould can foresee many blades to divide an internal cavity into many chambers, so as to thus be able to make products with more than two components brought together.

The invention claimed is:

1. A method for injection molding of a manufactured product in a mold, the manufactured product comprising a plurality of components, the mold comprising a plurality of parts, the plurality of parts comprising at least one mobile part, the method comprising the steps of:
   (a) moving the at least one mobile part into a first configuration; in the first configuration, the at least one mobile part comprising at least two distinct mold cavities;
   (b) injecting plastic material into the at least two distinct mold cavities to form at least a first and a second component of the plurality of components;
   (c) moving the at least one mobile part integrally and simultaneously into a second configuration; in the second configuration, the plurality of parts comprising at least a third mold cavity, wherein the at least third mold cavity is defined at least partially by respective surfaces of the at least first and second component; and
   (d) injecting plastic material into the at least third mold cavity to form at least a third component of the plurality of components so that a portion of a top surface of the at least third component matching a portion of a top surface of the first component, the third component being brought up to the second component;
   wherein in step (c) as the at least one mobile part moves from the first configuration to the second configuration, the at least one mobile part supports and moves the first component.

2. The method of claim 1, further comprising the steps of:
   (e) moving the at least one mobile part into a third configuration; in the third configuration, the plurality of parts comprising at least a fourth mold cavity, wherein the at least fourth mold cavity is defined at least partially by respective surfaces of the at least first and second components and the at least third component;
   (f) injecting plastic material into the at least fourth mold cavity to form at least a fourth component of the plurality of components that adheres to the other components.

3. The method of claim 2, wherein the mold comprises a plurality of mobile parts.

4. The method of claim 3, wherein one of the plurality of mobile parts defines at least partially the at least two distinct mold cavities and defines at least partially the at least fourth mold cavity.

5. The method of claim 3, wherein the plurality of mobile parts comprises a sliding block, the sliding block comprising a surface defining a wall of one of the at least two distinct mold cavities, the sliding block moving to take a portion of the at least first and second component from an opposite wall of a respective cavity, the space thus freed constituting the at least third cavity.

6. The method of claim 5, wherein the sliding block and one of the mobile parts associated with the one of the at least two distinct mold cavities are joined to move together.

7. The method of claim 4, wherein the one of the plurality of mobile parts is a sliding blade.

8. A mold for injection molding of a manufactured product comprising a plurality of components, the mold comprising:
   a plurality of parts, the plurality of parts comprising at least one mobile part, the mobile part being movable from a first configuration to a second configuration to form a plurality of mold cavities to permit injection molding of plastic material to sequentially form the plurality of components;
   wherein in the first configuration, the plurality of parts comprise at least two distinct mold cavities for molding at least a first and a second component of the plurality of components;
   wherein in the second configuration, the plurality of parts comprise at least a third mold cavity for molding at least a third component of the plurality of components, the at least third cavity being in communication with the at least two mold cavities or the at least two of the corresponding components;
   wherein a portion of the first component is a base onto which the at least third component is molded, the third component being brought up to the second component;
   wherein as the at least one mobile part moves from the first configuration to the second configuration, the at least one mobile part supports and moves the first component.

9. The mold of claim 8, wherein the at least one mobile part comprises a sliding block, the sliding block comprising a surface defining a wall of one of the at least two distinct mold cavities, the sliding block moving perpendicularly to the surface when the at least one mobile part moves from the first configuration to the second configuration.

10. The mold of claim 9, wherein the sliding block comprises a hot chamber where an injector is housed, the injector comprising a nozzle that opens on said surface.

11. The mold of claim 9, wherein the sliding block comprises at least one blade for separating at least two mold cavities.

12. The mold of claim 11, wherein the sliding block comprises two blades for separating at least two mold cavities, wherein the blades are at two ends of the sliding block.

13. The mold of claim 11, wherein the movable blade is mounted on the sliding block for moving relative to the sliding block along the same direction of movement between at least two operative positions.

14. The mold of claim 9, wherein the sliding block is mounted in a first mold portion opposite a second mold portion separable from the first mold portion, so that a union of the two portions creates the at least two distinct mold cavities.

15. The mold of claim 14, wherein the second mold portion comprises a ribbing, the ribbing projecting inside one of the at least two distinct mold cavities, the ribbing being arranged opposite a blade mounted on a mobile block, so that the blade can abut against the ribbing constituting the separating wall of two adjacent mold cavities of the at least two distinct mold cavities.

\* \* \* \* \*